(12) United States Patent
Liu et al.

(10) Patent No.: US 7,675,712 B2
(45) Date of Patent: Mar. 9, 2010

(54) RAMP STRUCTURE WITH INCLINED CONTACT SURFACE

(75) Inventors: Joseph Cheng-Tsu Liu, Singapore (SG); Xiong Liu, Singapore (SG); ChoonKiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 914 days.

(21) Appl. No.: 11/482,406

(22) Filed: Jul. 7, 2006

(65) Prior Publication Data

US 2008/0007874 A1  Jan. 10, 2008

(51) Int. Cl.
    *G11B 5/54* (2006.01)
(52) U.S. Cl. .................................................. 360/254.8
(58) Field of Classification Search .............. 360/254.3, 360/254.4, 254.7, 254.8
    See application file for complete search history.

(56) References Cited

U.S. PATENT DOCUMENTS

| | | | | |
|---|---|---|---|---|
| 5,526,206 | A * | 6/1996 | Shimizu | 360/254.8 |
| 5,585,980 | A | 12/1996 | Boutaghou | |
| 5,625,514 | A * | 4/1997 | Kubo et al. | 360/254.8 |
| 5,864,448 | A | 1/1999 | Berberich | |
| 5,973,887 | A | 10/1999 | Cameron | |
| 6,181,528 | B1 | 1/2001 | Reinhart et al. | |
| 6,201,666 | B1 | 3/2001 | Resh | |
| 6,414,821 | B1 | 7/2002 | Tokuyama et al. | |
| 6,594,219 | B1 | 7/2003 | Yamamoto et al. | |
| 6,611,402 | B1 | 8/2003 | Mangold | |
| 6,721,134 | B1 | 4/2004 | Pottebaum et al. | |
| 6,765,762 | B2 * | 7/2004 | Yanagihara | 360/254.8 |
| 6,864,448 | B2 | 3/2005 | Pozgay et al. | |
| 7,251,096 | B1 * | 7/2007 | Feliss et al. | 360/75 |
| 7,295,405 | B2 * | 11/2007 | Arikawa | 360/254.7 |
| 7,558,023 | B2 * | 7/2009 | Ohwe | 360/255 |
| 2005/0018354 | A1 * | 1/2005 | Takahashi | 360/254.8 |
| 2006/0012919 | A1 * | 1/2006 | Choi et al. | 360/244.2 |
| 2007/0076323 | A1 * | 4/2007 | Deguchi et al. | 360/254.7 |
| 2007/0206331 | A1 * | 9/2007 | Deguchi et al. | 360/255 |

* cited by examiner

*Primary Examiner*—Angel A. Castro
(74) *Attorney, Agent, or Firm*—Fellers, Snider, et al.

(57) ABSTRACT

An apparatus for unloading a moveable member comprises a ramp structure with an inclined surface. A lift tab of the moveable member advances along the ramp structure to the inclined surface while pivoting about a pivot point to undergo an increase in elevation above a base surface. The inclined surface has a slope determined in relation to angular deflection of the lift tab induced by said increase in elevation. Preferably, the slope of the inclined surface substantially matches an angle of the lift tab when the lift tab is disposed on the inclined surface. The inclined surface preferably constitutes a parking surface, and the ramp structure further preferably comprises an entry/exit ramp surface and a latch surface along which the lift tab travels to reach the parking surface. The moveable member preferably comprises a flexible suspension which supports a transducer adjacent a data storage medium in a data storage device.

20 Claims, 4 Drawing Sheets

RAMP STRUCTURE WITH INCLINED CONTACT SURFACE

FIELD OF THE INVENTION

The claimed invention relates generally to the field of actuated systems and more particularly, but not by way of limitation, to a ramp structure with an inclined contact surface to support a transducer in an unloaded position.

BACKGROUND

The ongoing commercialization of digital data processing devices has generally resulted in successive generations of devices having ever higher rates of functionality and interconnectivity. To this end, mass storage capabilities are being increasingly incorporated into a number of different types of devices, particularly with hand-held portable devices such as cell phones, digital cameras, personal data assistants (PDAs), etc.

A disc drive is a type of mass storage device that generally stores data on one or more rotatable magnetic recording discs. A corresponding array of data transducers (heads) is selectively moved across the surfaces of the discs to transduce data therewith. During periods of device non-use, the transducers can be unloaded from the media to a safe parked position, such as upon a ramp structure disposed adjacent a peripheral edge of the media.

While a variety of ramp load/unload structures have been proposed in the art for use in disc drives and other types of devices, there remains a continual need for improvements that promote increased functionality and reliability, particularly in high vibration and mechanical shock environments. It is to these and other improvements that preferred embodiments of the present invention are generally directed.

SUMMARY OF THE INVENTION

Preferred embodiments of the present invention are generally directed to an apparatus for unloading a moveable member.

In accordance with preferred embodiments, a ramp structure is provided having an inclined surface. A lift tab of the moveable member advances along the ramp structure to the inclined surface while pivoting about a pivot point to undergo an increase in elevation above a base surface. The inclined surface has a slope determined in relation to angular deflection of the lift tab induced by said increase in elevation.

Preferably, the slope of the inclined surface substantially matches an angle of the lift tab when the lift tab is disposed on the inclined surface. The inclined surface preferably constitutes a parking surface, and the ramp structure further preferably comprises an entry/exit ramp surface and a latch surface along which the lift tab travels to reach the parking surface. The entry/exit ramp surface and the latch surface are likewise preferably provided with respective inclines selected in relation to elevational deflection of the lift tab.

The moveable member preferably comprises a flexible suspension which supports a transducer adjacent a data storage medium in a data storage device. In this way, the ramp structure serves to facilitate loading and unloading of the transducer to and away from the medium.

These and various other features and advantages that characterize the claimed invention will be apparent upon reading the following detailed description and upon review of the associated drawings.

DETAILED DESCRIPTION

Figure 1:
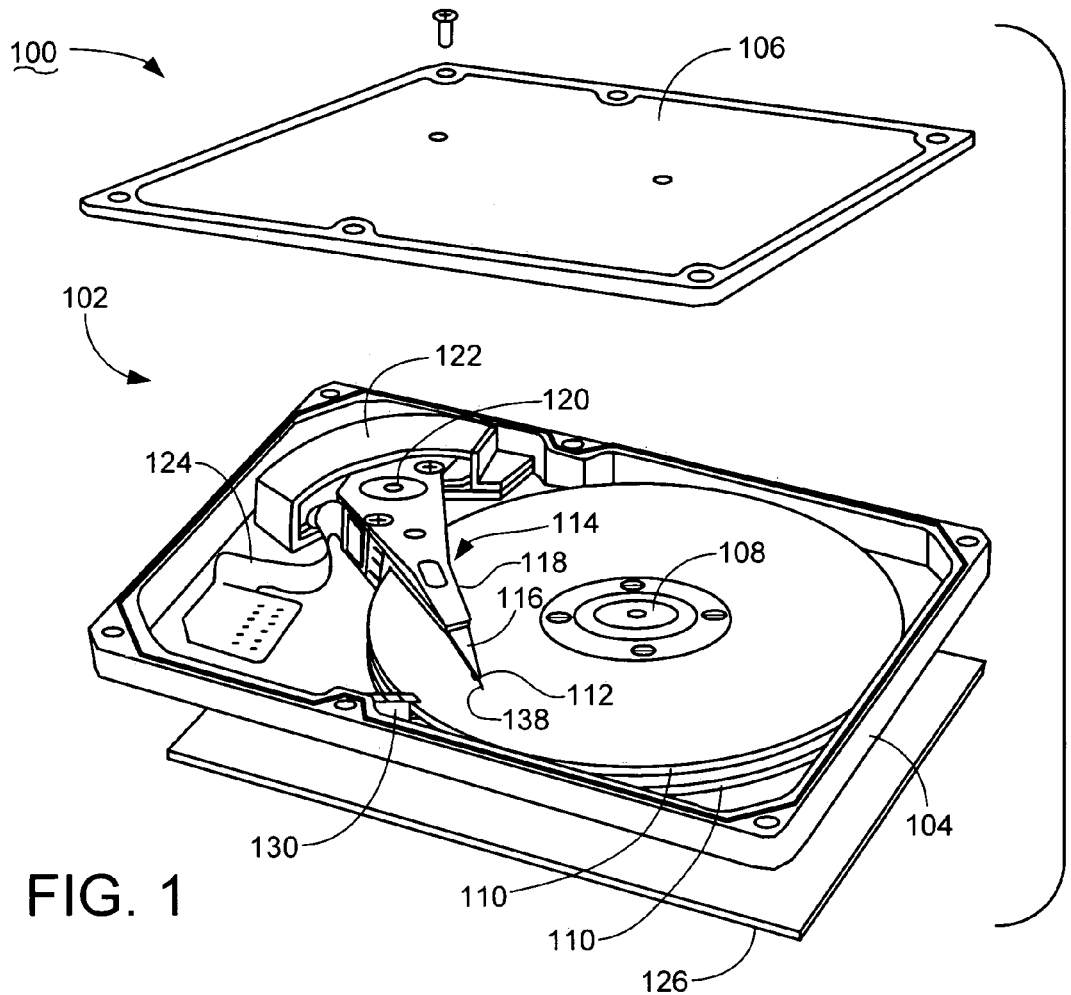
FIG. 1 is a plan view of a disc drive block data storage device constructed and operated in accordance with preferred embodiments of the present invention.

Referring now to the drawings, FIG. 1 provides a top plan view of a disc drive block data storage device 100. The drive 100 is provided to show an exemplary environment in which preferred embodiments of the present invention can be advantageously practiced. It will be understood, however, that the claimed invention is not so limited.

The device 100 includes a substantially sealed housing 102 formed from a base deck 104 and top cover 106. An internally disposed spindle motor 108 is configured to rotate a number of storage media 110. The media 110 are accessed by a corresponding array of data transducers 112. While FIG. 1 shows the use of two magnetic recording discs and four corresponding heads, other numbers of heads and discs (such as a single disc, etc.) and other types of media (such as optical media, etc.) can alternatively be utilized as desired.

A head-stack assembly ("HSA" or "actuator") is shown at 114. Each transducer 112 is preferably supported by a corresponding flexible suspension 116, which in turn is supported by a rigid actuator arm 118. The actuator 114 preferably pivots about a cartridge bearing assembly 120 through application of current to a voice coil motor (VCM) 122. In this way, controlled operation of the VCM 122 causes the transducers 122 to align with tracks (not shown) defined on the media surfaces to store data thereto or retrieve data therefrom.

FIG. 1 further shows a flex circuit assembly 124 that facilitates electrical communication between the actuator 114 and device control electronics on an externally disposed device printed circuit board (PCB) 126. The flex circuit assembly 124 includes VCM signal paths to accommodate the application of current to the VCM 122. The flex circuit assembly 124 further provides I/O signal paths to accommodate the transfer of write data to be written by the transducers 112, and readback data obtained by the transducers during a read operation.

When the device 100 is not in use, the transducers 112 are preferably moved (unloaded) to a ramp structure 130 located near an outermost periphery of the media. The ramp structure 130 serves to provide respective surfaces on which the transducers 112 can safely be disposed while the media 110 are in a non-rotational state. When device I/O operation is desired, the spindle motor 108 accelerates the media 110 to a velocity sufficient to support the transducers 112, and the transducers 112 are moved (loaded) from the ramp structure 124 to the media 110.

Figure 2:
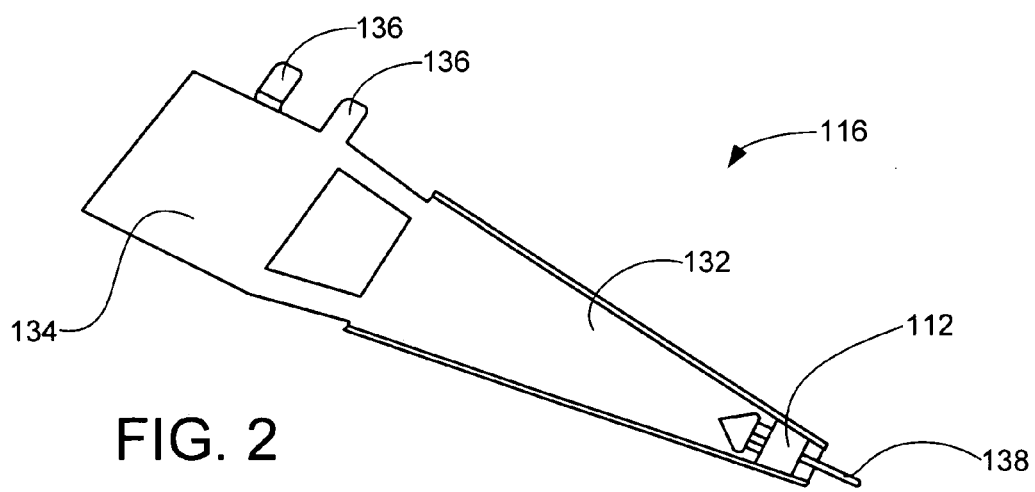
FIG. 2 shows relevant portions of the actuator of FIG. 1, including a suspension lift tab that interfaces with the ramp structure of FIG. 1.

FIG. 2 illustrates relevant portions of one of the flexible suspensions 116 of FIG. 1 in greater detail. For reference, FIG. 2 is an underside view of the topmost suspension 116 shown in FIG. 1.

The suspension 116 is shown to preferably include a load beam 132 which extends from a base 134. The base 134 is preferably attached to the distal end of the corresponding actuator arm 118 using adhesive or other suitable attachment mechanism. Support tabs 136 extend from the base 134 to support flex on suspension (FOS) conductors used to route signal paths from the transducer 112 to the flex circuit assembly 124.

The transducer 112 is gimbaled near a distal end of the load beam 132, and includes a slider structure (not separately designated) configured to hydrodynamically interact with a flow of fluidic currents established by high speed rotation of the media 110. In this way, the transducer 112 is maintained upon a stable bearing surface in close proximity to the media 110.

The load beam 132 is preferably characterized as a spring and is biased in a direction toward the corresponding media surface. A lift tab 138 projects from the distal end of the load beam 132 as shown. While a variety of relative angular orientations can be provided for the lift tab 138 with respect to the load beam 132, in a preferred embodiment the lift tab 138 is arranged to as to be substantially parallel to the media 110 when the transducer 112 is supported thereover during I/O operation.

The lift tab 138 is configured to engage the ramp structure 130 during head load/unload operations as explained below. At this point it will be noted that placement of the lift tab 138 at the distal end of the load beam 132 is preferred, but not required; rather, the lift tab 138 can be placed at any number of suitable locations along the length of the load beam 132 as desired. The lift tab 138, as well as the load beam 132, are preferably formed of stainless steel or other suitable material.

As will be recognized, prior art ramp load/unload systems have been proposed in the art which generally provide a point contact between the lift tab and the corresponding ramp surfaces. While operable, a limitation with these and other approaches is the undesired wear of the ramp surface along the leading edge/corner of the ramp structure. Over time, this can lead to undesired particulate generation within the device, as well as changes in the static and dynamic friction forces encountered by the lift tab as it traces a path along the ramp structure.

Figure 3:
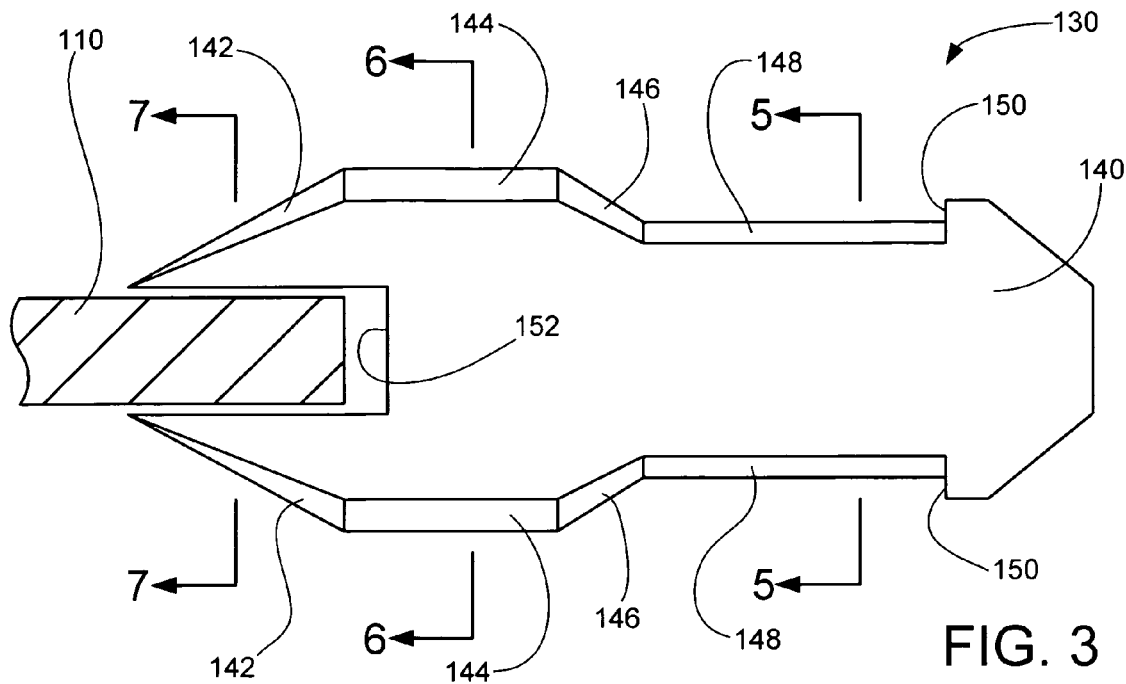
FIG. 3 provides a side elevational view of relevant portions of the ramp structure of FIG. 1 to illustrate incorporation of an inclined contact surface in accordance with preferred embodiments.
Figure 4:
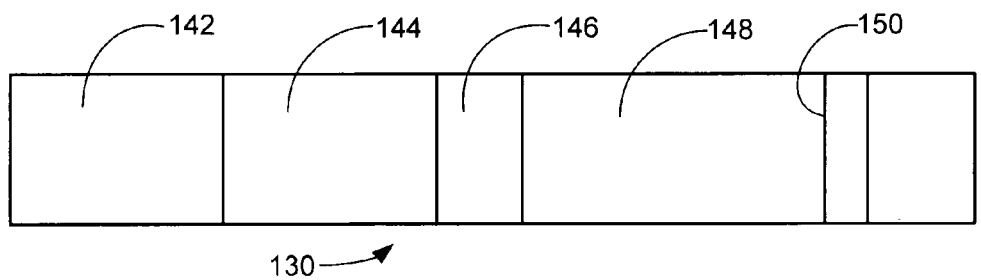
FIG. 4 shows a top plan view of the ramp structure of FIG. 3.

Accordingly, preferred embodiments of the present invention provide the ramp structure 130 with one or more inclined surfaces, such as generally shown in FIG. 3. More particularly, FIG. 3 provides an elevational representation of relevant portions of the ramp structure 130 with opposing ramp structures to accommodate the associated transducers 112 adjacent the recording surfaces of a first medium 110 in FIG. 1. It will be understood that a second structure nominally identical to that shown in FIG. 3 is provided to accommodate the transducers 112 for the second medium 110 of FIG. 1. FIG. 4 provides a corresponding top plan view of the structure 130 in FIG. 3.

The ramp structure 130 is preferably formed of injected molded plastic or similar material with relatively low wear characteristics. The ramp structure preferably includes a central body portion 140 with opposing ramped entry/exit surfaces 142, latch surfaces 144, transitional surfaces 146, and parking surfaces 148. Each of these surfaces is preferably inclined (sloped) with respect to the associated media surface in relation to an elevational height above or below the associated media surface.

During an unload operation, the transducers 112 are moved outwardly toward the ramp structure 130 so that the lift tabs 138 contactingly travel along the respective surfaces 142, 144 and 146 and come to rest upon the parking surfaces 148. The transitional surfaces 146 and limit stop surfaces 150 preferably serve to retain the lift tabs 138 within the radial range of the parking surfaces 148 when the device 100 is deactivated. An additional latching mechanism, such as a magnetic latch (not shown) adjacent the VCM 122 is preferably used to retain the actuator 114 in the latched (unloaded) position.

It will be appreciated that any number of suitable shapes and arrangements for the respective zones of the ramp structure 130 can be utilized as desired, including a ramp structure that curvilinearly extends along a rotational path of travel of the lift tabs 138. Similarly, the angles of incline shown in FIG. 3 are somewhat exaggerated for clarity of illustration and can be selectively provided as dictated by the requirements of a given application.

Channel surfaces 152 are preferably provided within the body 140 to receivingly nest an outermost peripheral edge of the medium 110. This allows the entry/exit ramp surfaces 142 to extend out over the media surfaces as shown to ensure reliable transition of the transducers from the media 110 to the ramp structure 130. At the same time, the entry/exit ramp surfaces 142 are preferably placed as near as practical to the outermost peripheral edges of the media 110 to increase the available media recording area.

As mentioned above, the respective surfaces 142, 144, 146 and 148 are preferably inclined with respect to the media surfaces. A preferred inclined orientation for the parking surfaces 148 is represented in FIG. 5, which shows a cross-sectional depiction of the ramp structure 130 taken along line 5-5 in FIG. 3.

Figure 5:
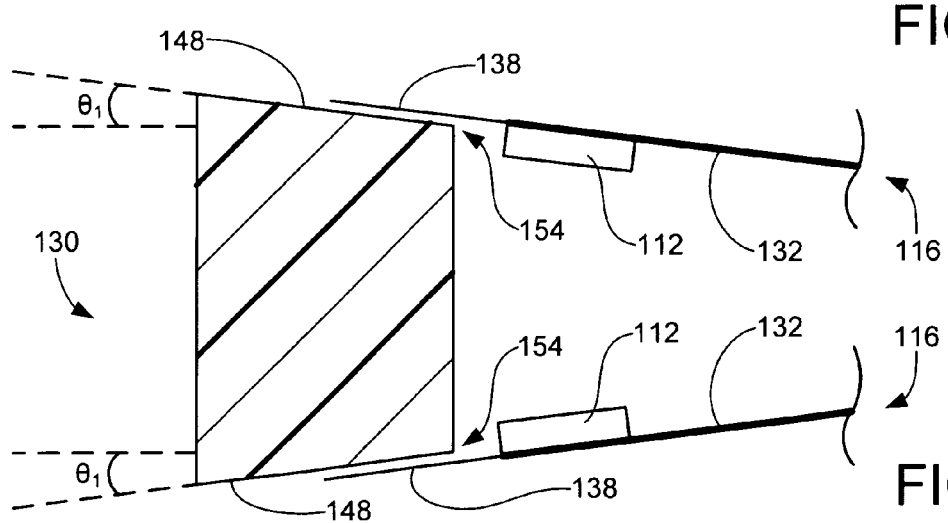
FIG. 5 shows a cross-sectional representation of a park zone of the ramp structure of FIG. 3 as generally viewed along line 5-5 in FIG. 3.

As represented in FIG. 5, the parking surfaces 148 are configured so as to be nominally parallel to the lift tabs 138 when the lift tabs 138 come to rest thereon. The incline, as depicted by angle $\theta_1$, will preferably match the angle of the lift tab 138 at this point, and can be, for example, on the order of a few degrees. This helps to ensure that contact between the lift tab 138 and the ramp structure 130 is established along the parking surface 148 and is not localized along corner edge surfaces 154.

Figure 6:
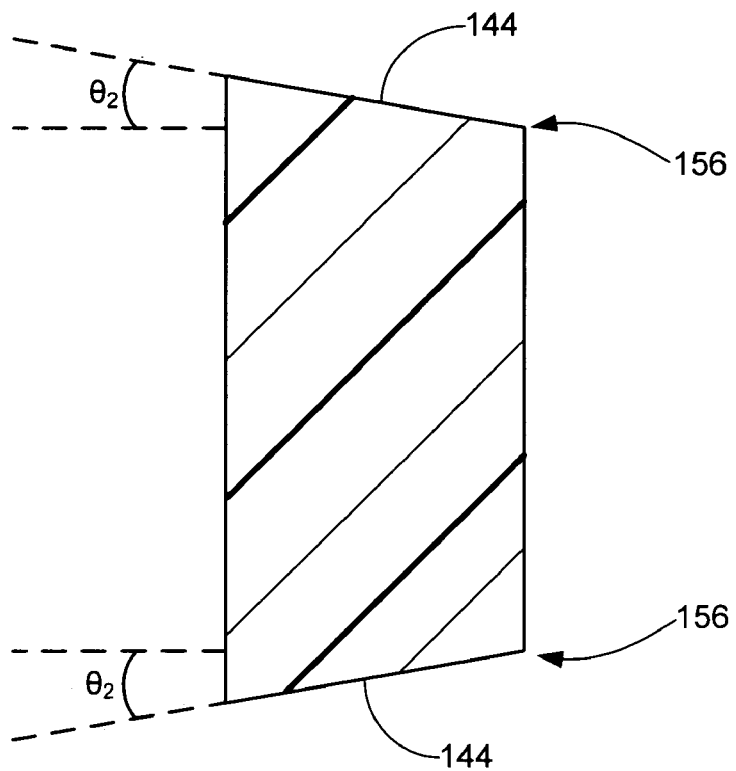
FIG. 6 shows a cross-sectional representation of a latch zone of the ramp structure of FIG. 3 as generally viewed along line 6-6 in FIG. 3.

FIG. 6 provides a corresponding cross-sectional view of the ramp structure 130 along lines 6-6 in FIG. 3 to show a preferred orientation of the latch surfaces 144. While the latch surfaces 144 can be provisioned with the same angular incline as the parking surfaces 148, or even with no angular incline at all, preferably the latch surfaces 144 have a greater incline as measured by angle $\theta_2$, with $\theta_2 > \theta_1$. As before, the angle $\theta_2$ is preferably selected so that the lift tabs 138 will be substantially parallel to the surfaces 144 as the lift tabs travel thereacross, thereby increasing the consistency of the tab/surface interface and reducing point contact along corner surfaces 156.

Figure 7:
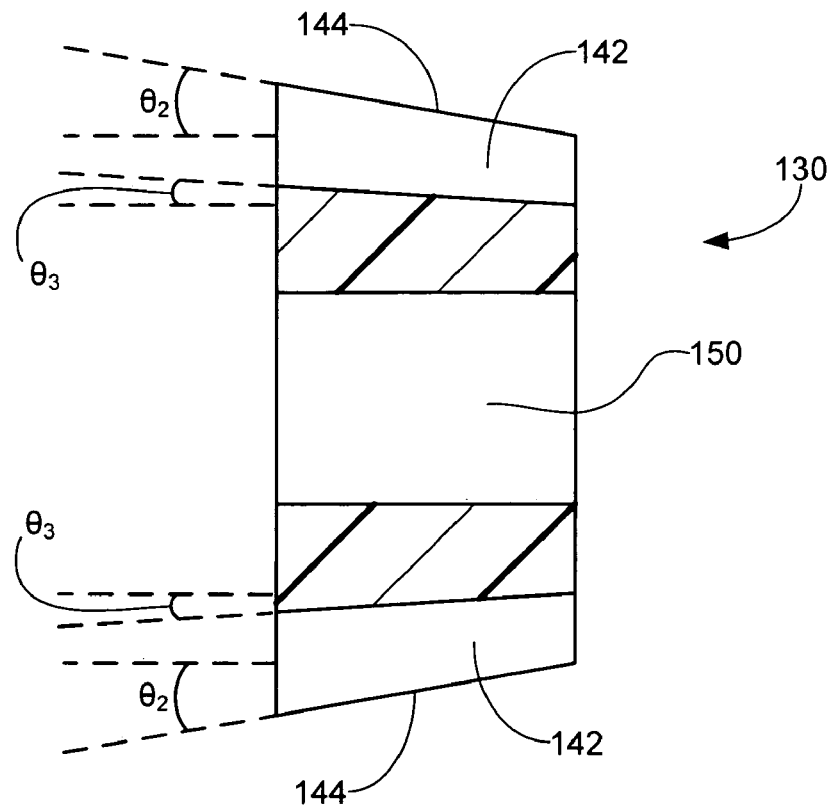
FIG. 7 shows a cross-sectional representation of an entry/exit zone of the ramp structure of FIG. 3 as generally viewed along line 7-7 in FIG. 3.

The entry/exit ramp surfaces 142 are generally depicted in FIG. 7, which provides a cross-sectional view as taken along line 7-7 in FIG. 3. The ramp surfaces 142 preferably continuously transition from substantially no incline at the beginning of the ramp adjacent the medium 110, up to the incline $\theta_2$ of the latch surfaces 144. At the intermediary point at which the cross-section of FIG. 7 is taken, the ramp surfaces 142 are shown to preferably exhibit an incline angle of $\theta_3$, with $\theta_3<\theta_2$. Although not separately shown, it will be understood that the transition surfaces 146 preferably transition in similar fashion between $\theta_2$ and $\theta_1$.

Figure 8:
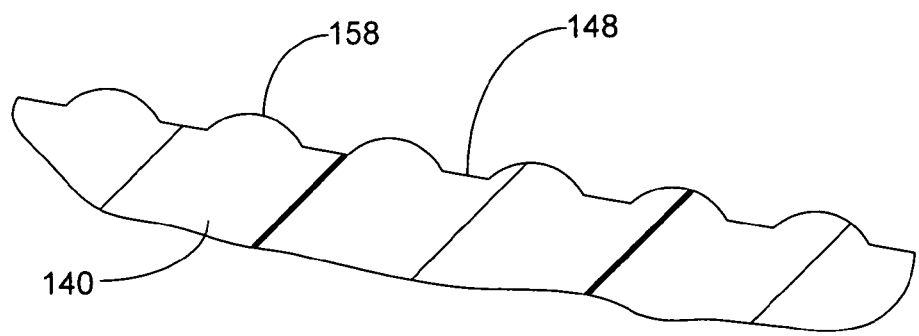
FIG. 8 shows a preferred application of texturing to the ramp structure.

The ramp surfaces can be texturized or otherwise prepared to provide a better and more consistent frictional characteristic for the lift tabs 138. An example of such texturizing is illustrated in FIG. 8 by a series of detents 158 provided to the parking surface 148.

While the inclined surfaces have been shown to be preferably characterized as planar linear surfaces, such is not necessarily required. Rather, the surfaces can alternatively be inclined planar curvilinear surfaces, such as exemplified in FIG. 9. As before, the surfaces 148 shown in FIG. 9 are inclined to substantially match the incline of the lift tabs 138.

Figure 9:
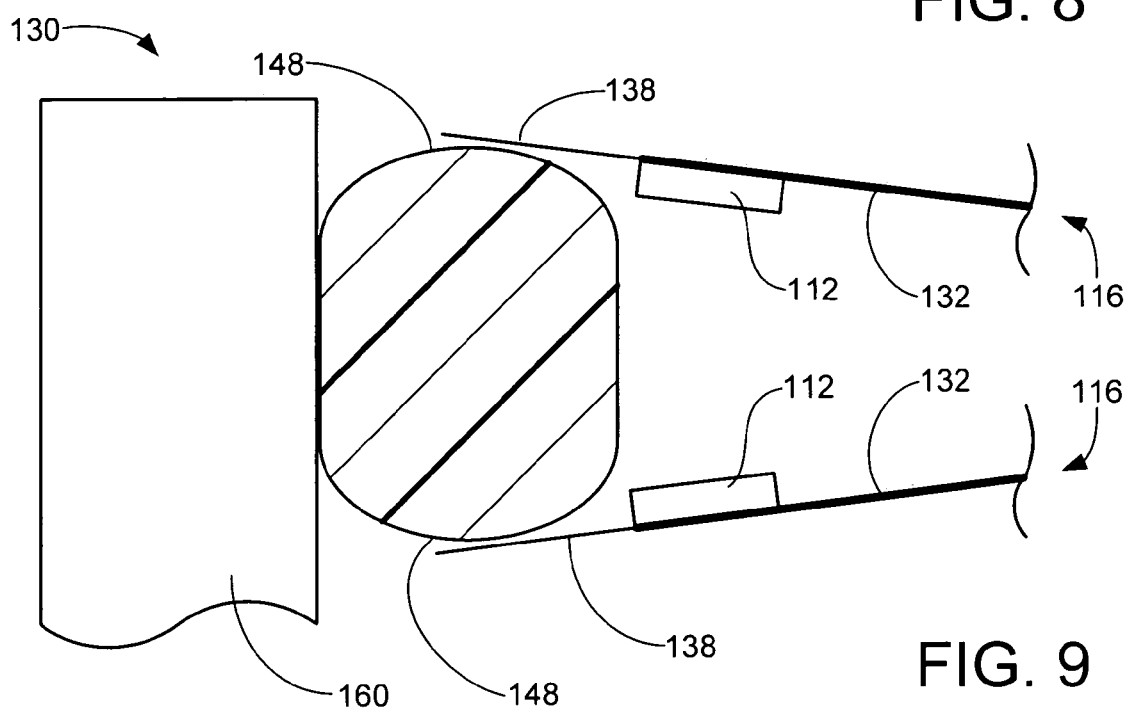
FIG. 9 provides an alternative embodiment of the ramp structure that employs planar curvilinear surfaces.

For clarity, FIG. 9 further illustrates a base support member 160 to better illustrate a preferred manner in which the surfaces 148 of FIG. 9, as well as the ramp surfaces shown in FIGS. 3-7, are preferably supported. The base support member 160 preferably engages the base deck 102 and extends substantially normal thereto. The various inclined surfaces discussed herein can thus be characterized as being skewed (e.g., non-normal) with respect to the base support member 160.

Figure 10:
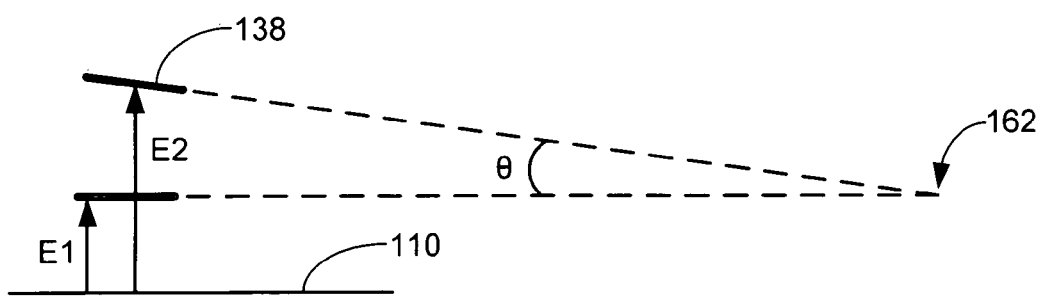
FIG. 10 provides a schematic diagram to further illustrate the preferred manner in which an inclined surface of the ramp structure has a slope determined in relation to angular deflection of the lift tab induced by an increase in elevation as the lift tab is radially advanced to the inclined surface.

It can now be seen that the angle of incline of the various ramp surfaces will preferably be determined in view of the simple geometric relationship between the distance from the top surface of the ramp to the lift tab bottom and load beam length. More specifically, as illustrated by FIG. 10, the lift tab 138 starts at a first position at a first elevation E1 adjacent a base surface (e.g., the associated medium 110), and contactingly advances along the ramp structure 130 to a second position at a second elevation E2 on the associated inclined surface (e.g., parking surface 148). The incline of the surface is preferably determined with respect to pivot point 162 (e.g., base 134, FIG. 2) as the lift tab 138 moves from E1 to E2.

The use of inclined ramp surfaces as exemplified herein provides several advantages over the prior art. The actual paths taken by the lift tabs 138, even in the case of a point contact, can be more closely controlled and ensured to follow along the surfaces of the ramp structure (e.g., 142, 144, 146, 148) rather than along the edges (e.g., 154, 156). As the edges have been found to be difficult to produce accurately in certain types of molding processes, the above preferred configurations reduce or eliminate the likelihood that contact will take place between the edges of the ramps and the load tabs.

The inclined surfaces also generally increase the types of lift tab configurations that can be utilized; for example, a generally cylindrical load tab can be used, as well as one with a detent or other contact feature.

Moreover, while preferred embodiments discussed herein have placed the incline to substantially match that of the lift tabs, this is not necessarily required; rather, it can be readily seen that other angular configurations, including inclines of the ramp surfaces that are greater than the angle of the lift tabs, can also be used as desired to improve the advancement path between the lift tabs and the ramp structures and to accommodate manufacturing tolerances.

Finally, while preferred embodiments have been directed to transducer loading/unloading in a data storage device, it will be appreciated that the claimed invention can readily be utilized in any number of other applications, including non-data storage device applications.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
    a ramp structure comprising an inclined surface skewed with respect to a media surface; and
    a moveable member comprising a lift tab configured to advance along the ramp structure while pivoting about a pivot point to undergo an increase in elevation above the media surface, the inclined surface having an angle of incline with respect to the media surface in a direction perpendicular to a direction of travel of the moveable member along the ramp structure, the angle of incline determined to be generally coincident with the angle of the lift tab relative to the media surface which changes in relation to angular deflection of the lift tab induced by said increase in elevation.

2. The apparatus of claim 1, wherein the base surface comprises a horizontal surface, and wherein the inclined surface is non-parallel to the media surface.

3. The apparatus of claim 1, wherein the lift tab extends at a first angle with respect to the media surface away from the ramp structure, wherein the lift tab extends at a second angle with respect to the media surface when the lift tab contactingly engages the inclined surface, and wherein the angle of incline of the inclined surface substantially matches said second angle.

4. The apparatus of claim 1, wherein the inclined surface is characterized as a planar linear surface.

5. The apparatus of claim 1, wherein the inclined surface is characterized as a planar curvilinear surface.

6. The apparatus of claim 1, wherein the ramp structure further comprises a base support member which supports the inclined surface, and wherein the inclined surface is skewed with respect to the base support member in a direction toward the lift tab.

7. The apparatus of claim 1, wherein the inclined surface is characterized as a parking surface on which the lift tab is configured to come to rest, wherein the ramp structure further comprises an entry/exit ramp surface adjacent the parking surface, and wherein the lift tab contactingly moves along the entry/exit ramp surface prior to contactingly engaging the parking surface.

8. The apparatus of claim 7, wherein the entry/exit ramp surface has a continuously varying slope with respect to a length thereof, said slope varying in relation to a change in elevational height of the lift tab as the lift tab moves along said length.

9. The apparatus of claim 7, wherein the ramp structure further comprises a latch surface disposed between the entry/exit ramp surface and the parking surface along which the lift tab contactingly advances to reach the parking surface, wherein the latch surface is at an elevation greater than the elevation of the parking surface, and wherein the latch surface has a slope greater than the slope of the parking surface.

10. The apparatus of claim 1, wherein the inclined surface is selectively texturized to provide a desired frictional interface with the lift tab.

11. The apparatus of claim 1, wherein the moveable member is characterized as a flexible suspension of a data storage device that supports a transducer adjacent a data storage medium, and wherein the ramp structure is disposed adjacent a peripheral edge of said medium to facilitate loading and unloading of the transducer to and away from said medium.

12. In an apparatus comprising a moveable member comprising a lift tab configured to advance along a ramp structure while pivoting about a pivot point to undergo an increase in elevation above a media surface, the improvement characterized as the ramp structure comprising:

an inclined surface configured to contactingly support the lift tab, the inclined surface having an angle of incline with respect to the media surface in a direction perpendicular to a direction of travel of the moveable member along the ramp structure, the angle of incline determined to be generally coincident with the angle of the lift tab relative to the media surface which changes in relation to angular deflection of the lift tab induced by said increase in elevation.

13. The improvement of claim 12, wherein the media surface comprises a horizontal surface, and wherein the inclined surface is non-parallel to the media surface along said angle of incline.

14. The improvement of claim 12, wherein the lift tab extends at a first angle with respect to the media surface away from the ramp structure, wherein the lift tab extends at a second angle with respect to the media surface when the lift tab contactingly engages the inclined surface, and wherein the angle of incline of the inclined surface substantially matches said second angle.

15. The improvement of claim 12, wherein the inclined surface is characterized as a planar linear surface.

16. The improvement of claim 12, wherein the inclined surface is characterized as a planar curvilinear surface.

17. The improvement of claim 12, wherein the inclined surface is characterized as a parking surface on which the lift tab is configured to come to rest, wherein the ramp structure further comprises an entry/exit ramp surface adjacent the parking surface, and wherein the lift tab contactingly moves along the entry/exit ramp surface prior to contactingly engaging the parking surface.

18. The improvement of claim 17, wherein the entry/exit ramp surface has a continuously varying slope with respect to a length thereof, said slope varying in relation to a change in elevational height of the lift tab as the lift tab moves along said length.

19. The improvement of claim 17, wherein the ramp structure further comprises a latch surface disposed between the entry/exit ramp surface and the parking surface along which the lift tab contactingly advances to reach the parking surface, wherein the latch surface is at an elevation greater than the elevation of the parking surface, and wherein the latch surface has a slope greater than the slope of the parking surface.

20. The improvement of claim 12, wherein the ramp structure further comprises a base support member which supports the inclined surface, and wherein the inclined surface is skewed with respect to the base support member in a direction toward the lift tab.

* * * * *